United States Patent
Noske et al.

(10) Patent No.: US 10,329,019 B2
(45) Date of Patent: Jun. 25, 2019

(54) INDUCTIVE POWER TRANSMISSION IN AIRCRAFT SEATS

(71) Applicant: Safran Seats USA LLC, Gainesville, TX (US)

(72) Inventors: Mark E. Noske, Santa Maria, CA (US); C. Michael Parker, Denton, TX (US)

(73) Assignee: Safran Seats USA LLC, Gainesville, TX (US)

( * ) Notice: Subject to any disclaimer, the term of this patent is extended or adjusted under 35 U.S.C. 154(b) by 96 days.

(21) Appl. No.: 15/128,221

(22) PCT Filed: Apr. 7, 2015

(86) PCT No.: PCT/US2015/024748
§ 371 (c)(1),
(2) Date: Sep. 22, 2016

(87) PCT Pub. No.: WO2015/157309
PCT Pub. Date: Oct. 15, 2015

(65) Prior Publication Data
US 2017/0101187 A1 Apr. 13, 2017

Related U.S. Application Data

(60) Provisional application No. 61/976,452, filed on Apr. 7, 2014, provisional application No. 62/093,880, filed on Dec. 18, 2014.

(51) Int. Cl.
*H02J 50/10* (2016.01)
*B64D 11/06* (2006.01)
(Continued)

(52) U.S. Cl.
CPC ...... *B64D 11/0624* (2014.12); *B64D 11/0638* (2014.12); *H02J 5/005* (2013.01);
(Continued)

(58) Field of Classification Search
CPC .................................. H02J 50/10; H02J 50/12
See application file for complete search history.

(56) References Cited

U.S. PATENT DOCUMENTS 4,159,071 A * 6/1979 Roca .................... A47C 7/70
108/42
5,455,467 A * 10/1995 Young .................. H02J 50/10
307/104

(Continued)

FOREIGN PATENT DOCUMENTS

| CN | 102239633 | 11/2011 |
|---|---|---|
| GB | 2340389 | 2/2000 |
| WO | 2015157309 | 10/2015 |

OTHER PUBLICATIONS

International Patent Application No. PCT/US2015/024748, Search Report and Written Opinion dated Jun. 1, 2015.

(Continued)

*Primary Examiner* — Fritz M Fleming
(74) *Attorney, Agent, or Firm* — Kilpatrick Townsend & Stockton LLP; Dean W. Russell; Davidson G. Lucas

(57) ABSTRACT

Described are aircraft passenger seat assemblies with a passenger seat, a component with an outer surface attached the passenger seat. An inductive wireless power unit with a coil assembly is included with the aircraft passenger seat assembly, and the coil assembly is positioned within the component. A portion of the outer surface of the component covers the coil assembly. Wires connecting the coil assembly to a power supply are hidden from view within the aircraft passenger seat assembly.

26 Claims, 16 Drawing Sheets

(51) Int. Cl.
*H02J 50/40* (2016.01)
*H02J 5/00* (2016.01)
*H02J 7/02* (2016.01)

(52) U.S. Cl.
CPC .............. *H02J 7/025* (2013.01); *H02J 50/10* (2016.02); *H02J 50/40* (2016.02)

(56) References Cited

U.S. PATENT DOCUMENTS

| | | |
|---|---|---|
| 6,489,745 B1 | 12/2002 | Koreis |
| 8,826,830 B2 * | 9/2014 | Pajic .................. H02J 50/10 108/44 |
| 2010/0201201 A1 | 8/2010 | Mobarhan et al. |
| 2012/0201201 A1 | 8/2012 | Liu et al. |
| 2013/0005251 A1 | 1/2013 | Soar |
| 2013/0221744 A1 | 8/2013 | Hall et al. |

OTHER PUBLICATIONS

China Patent Application No. 201580017816.8, Office Action and Search Report, dated Nov. 2, 2018.
Japan Patent Application No. 2016-561285, Office Action (including English translation), dated Dec. 25, 2018.

\* cited by examiner

INDUCTIVE POWER TRANSMISSION IN AIRCRAFT SEATS

CROSS REFERENCE TO RELATED APPLICATIONS

This application is the U.S. national phase entry of International Patent Application Serial No. PCT/US2015/024748 ("the '748 application"), filed on Apr. 7, 2015, which application is related to and claims priority benefits from U.S. Provisional Application Ser. No. 61/976,452 ("the '452 application"), filed on Apr. 7, 2014, entitled INDUCTIVE POWER TRANSMISSION, AIRCRAFT CABIN INTERIORS, and U.S. Provisional Application Ser. No. 62/093,880 ("the '880 application"), filed on Dec. 18, 2014, entitled INDUCTION WIRELESS CHARGING INTEGRATED INTO A COMMERCIAL AIRCRAFT PASSENGER SEAT, the entire contents of each of which are incorporated herein by reference.

FIELD OF THE INVENTION

The invention relates to inductive power transmission incorporated into aircraft seats.

BACKGROUND

Wireless power transfer ("WPT") or wireless energy transmission is the transmission of electrical power from a power source to a consuming device without using solid wires or conductors. It is a generic term that refers to a number of different power transmission technologies that use time-varying electromagnetic fields. Wireless transmission is useful to power electrical devices in cases where interconnecting wires are inconvenient, hazardous, or are not possible. In wireless power transfer generally, a transmitter device connected to a power source transmits power by an electromagnetic field across an intervening space to one or more receiver devices, where it is converted back to electric power and utilized.

Wireless power techniques fall into two categories, non-radiative and radiative. In near-field or non-radiative techniques, power may be transferred over short distances by magnetic fields using inductive coupling between coils of wire (also known as inductive power transmission). Typically, in inductive power transmission, the circuit acting as the power source generates an alternating current that is fed to a first set of coils, which responds to the alternating current by producing an alternating magnetic field that permeates the space around it. A second circuit acting as the load, containing a second set of coils, is placed in such a way as to immerse the second set of coils in the magnetic field generated by the first circuit. The second set of coils in the second circuit responds to the alternating magnetic field by generating an electromotive force, EMF, that can in turn generate a current in the second circuit, effectively transferring power form the first circuit to the second circuit. Additional circuitry on the second circuit may rectify the alternating current so that direct current devices can be utilized. If the first circuit, also known as a transmitter, and the second circuit, also known as a receiver, are tuned so that they resonate with each other, greater distances and more efficiency can be achieved.

Applications of this type are electric toothbrush chargers, RFID tags, smartcards, and chargers for implantable medical devices like artificial cardiac pacemakers, and inductive powering or charging of electric vehicles like trains or buses.

More recently, wireless systems utilizing inductive power transmission "IPT" (also known as inductive wireless charging) have been developed to charge mobile and handheld computing devices, such as cellphones, digital music players, and portable computers without being tethered to a wall plug. These IPT devices are currently being utilized in the automotive/mass transport industries, as well as in some major restaurant chains, which allows people to leave their cables and chargers at home.

As aircraft interiors continue to integrate electronic devices, as well as become more compatible with personal electronic devices ("PEDs") brought aboard by passengers, IPT offers an opportunity to operate these PEDs in the aircraft cabin without being encumbered by electrical power lines, as well as a way to provide more robust electrical power supply systems for devices mounted on articulating components. In addition to supplying power for PEDs directly, IPT can be used to provide a station for charging devices that contain batteries, whether they are integrated into the cabin or a passenger's PED.

In particular, IPT offers an attractive alternative to other forms of wireless charging that require the user to either alter the battery pack in the device, or attach an unattractive/obtrusive charging case to charge the device conductively (i.e., to form a metal-to-metal connection between the charger and the device requiring charging). These conductive charging stations are undesirable in aircraft because of the exposure to various elements, such as spilled drinks, foreign debris, etc. In contrast, IPT can be used with a variety of surfaces, profiles, and materials positioned between the charger and the device requiring charging. As a result, IPT is a good candidate for integrating within different components in aircraft seat structures.

A drawback to the adoption of IPT generally has been the lack of a uniform charging standard. Currently, there are three major charging standards that the mobile industry is supporting: Qi, which is supported by the Wireless Charging Consortium ("WPC"), Rezence, which is supported by Alliance for Wireless Power ("A4WP"), and Powermat, which is supported by the Power Matters Alliance ("PMA"). In January 2015, A4WP and PMA announced that the two organizations will merge into a new organization with the intent to consolidate the industry.

Qi is an interface standard developed by the WPC for inductive electrical power transfer over distance of up to 4 cm (1.6 in) based on resonant inductive coupling. It comprises a power transmission pad and a compatible receiver in a portable device. Low-power delivers up to 5 W (typically used to charge mobile devices), medium-power delivers up to 120 W (typically used to power displays and laptops), and high-power will deliver up to 1 kW, allowing powering kitchen utensils, etc.

Some specific drawbacks to adoption of IPT in aircraft, among others, has been the concern over wasting power consumption when no device requiring charging is present, overheating the lithium ion batteries, and over-charging. Recent developments in IPT printed circuit board ("PCB") technology have addressed many of these concerns by including technology that discerns between metallic objects (such as soda cans, keys, metal heat transfer elements built into aircraft components) and PEDs so that the power transfer is only initiated when a PED is present. Furthermore, the IPT PCB has been provided with the ability to prevent power transfer when the temperature in the PED exceeds a threshold value, such as 60° C. The IPT PCB has also been provided with the ability to detect charging capacity and terminate power transfer when the charging capacity of the PED reaches 98%. With these improvements, IPT technology has recently been approved by the FAA for inclusion in aircraft generally.

Thus, with the recent FAA approval, it is desirable to design aircraft passenger seats that incorporate IPT technology in locations that facilitate wireless charging of PEDs through various modifications of the seat components without negatively impacting manufacturing costs, material costs, and/or installation and use of such seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft passenger seat assembly comprises a passenger seat, a component comprising an outer surface positioned proximate to the passenger seat, and an inductive wireless power unit comprising a coil assembly, wherein the coil assembly is positioned within the component, wherein a portion of the outer surface of the component covers the coil assembly, and wherein wires connecting the coil assembly to a power supply are hidden from view within the aircraft passenger seat assembly.

In some embodiments, the component is at least one of a shell surrounding the passenger seat, a headrest, an arm rest, and a cocktail tray. The inductive wireless power unit may further comprise a printed circuit board positioned within the passenger seat.

In certain embodiments, the portion of the outer surface covering the coil assembly is formed of non-metallic materials. The portion of the outer surface covering the coil assembly may be integrally formed with a remainder of the outer surface and/or may be coupled to a remainder of the outer surface.

In certain embodiments, the inductive wireless power unit is configured so that the coil assembly charges a personal electronic device having a second coil assembly positioned at a distance of 9 mm-35 mm from the coil assembly.

According to certain embodiments of the present invention, an aircraft passenger seat assembly comprises a passenger seat back comprising an outer shroud, and an inductive wireless power unit comprising a coil assembly, wherein the coil assembly is positioned within the passenger seat back, wherein a portion of the outer shroud covers the coil assembly, and wherein wires connecting the coil assembly to a power supply are hidden from view within the passenger seat back.

In certain embodiments, the inductive wireless power unit further comprises a printed circuit board positioned within the passenger seat back.

In certain embodiments, the portion of the outer shroud covering the coil assembly is formed of non-metallic materials. The portion of the outer shroud covering the coil assembly may be integrally formed with a remainder of the outer shroud and/or may be coupled to a remainder of the outer shroud.

According to some embodiments, the coil assembly may be positioned behind an upper literature pocket, a lower literature pocket, and/or a stowage location for a tray table. In some embodiments, a second coil assembly is positioned within the tray table in a location that is within close proximity of the coil assembly when the tray table is in a stowed position. In some embodiments, the tray table comprises an electronic reader.

According to certain embodiments of the present invention, an aircraft passenger seat assembly comprises a tray table comprising an outer shroud and tray table arms pivotally coupled to the aircraft passenger seat assembly, and an inductive wireless power unit comprising a coil assembly, wherein the coil assembly is positioned within the tray table, wherein a portion of the outer shroud covers the coil assembly, and wherein wires connecting the coil assembly to a power supply are hidden from view along at least one of the tray table arms.

In certain embodiments, the inductive wireless power unit further comprises a printed circuit board positioned within the aircraft passenger seat assembly.

In certain embodiments, the portion of the outer shroud covering the coil assembly is formed of non-metallic materials. The portion of the outer shroud covering the coil assembly may be integrally formed with a remainder of the outer shroud and/or may be coupled to a remainder of the outer shroud.

In some embodiments, the wires are routed through a hollow core located within one of the arms and/or along an outer surface of one of the arms.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
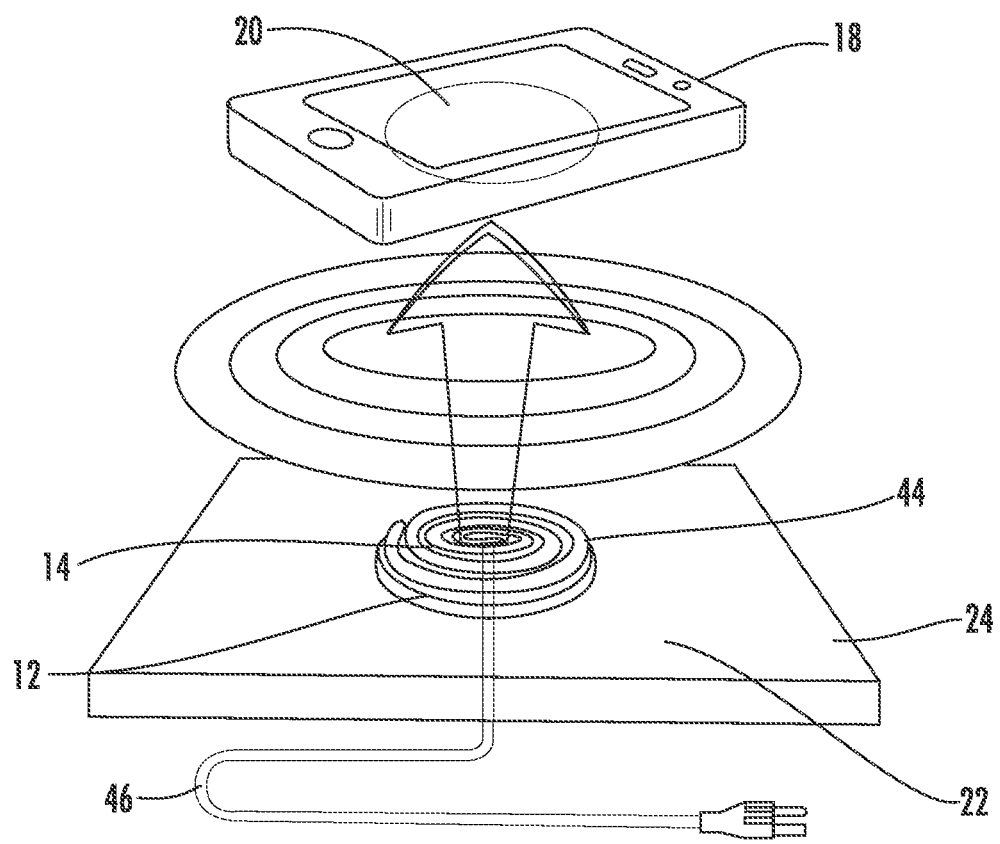
FIG. 1 is an illustration of an inductive wireless power unit positioned within a tray table with a personal electronic device positioned in close proximity to the inductive wireless power unit so that the battery in the personal electronic device is being charged, according to certain embodiments of the present invention.
Figure 2:
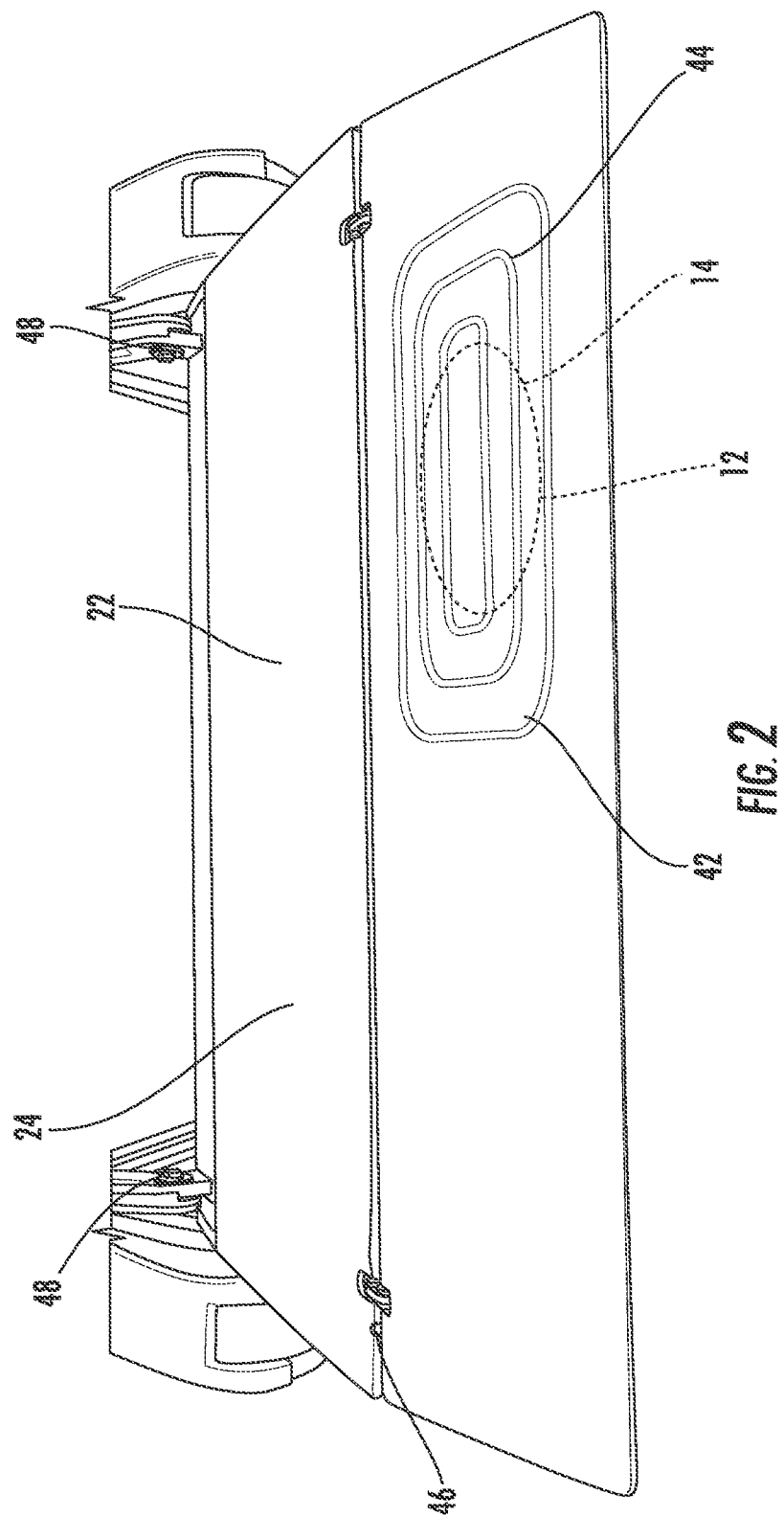
FIG. 2 is a top view of a tray table with a power location positioned above a coil assembly of an inductive wireless power unit, according to certain embodiments of the present invention.
Figure 3:
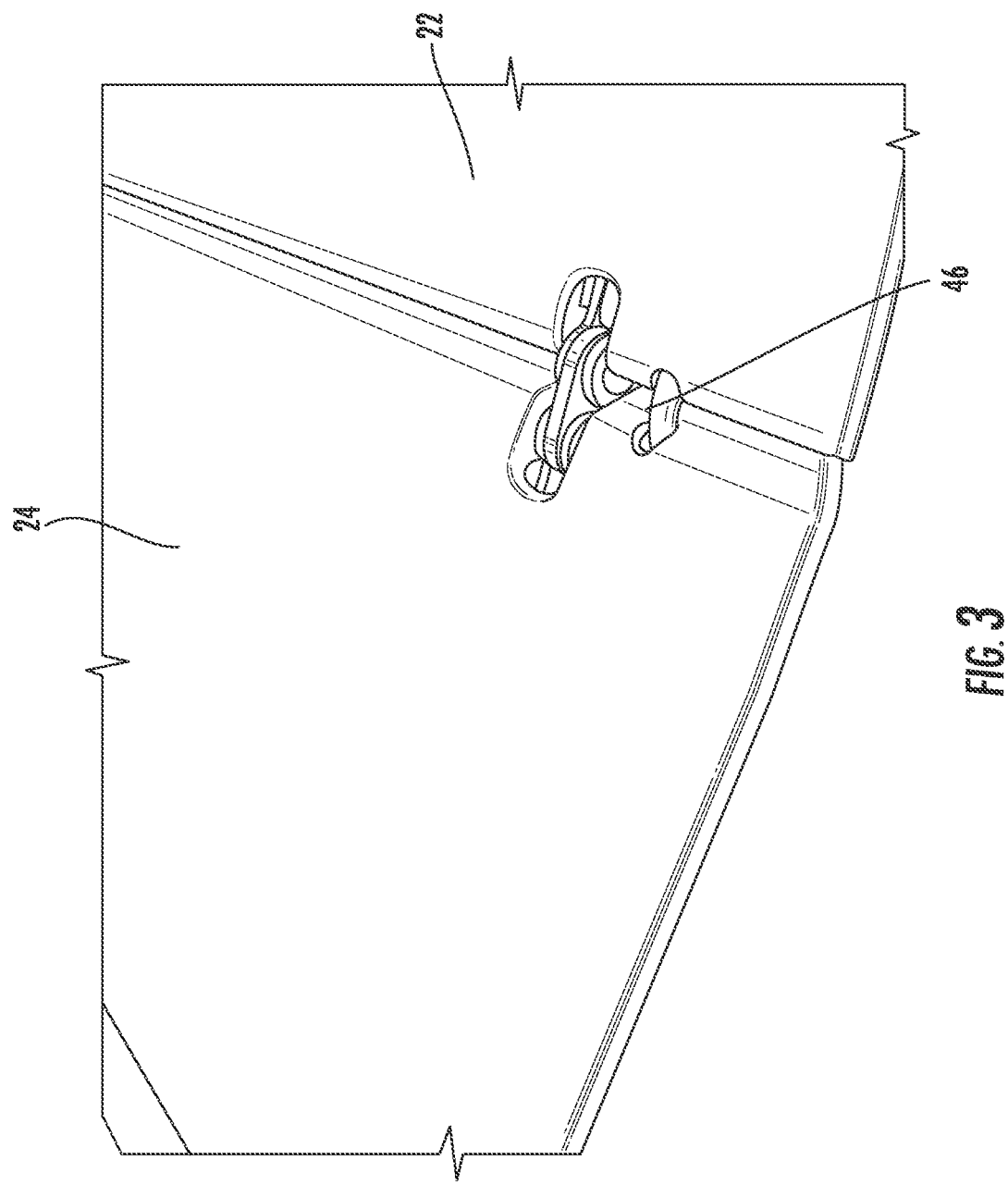
FIG. 3 is a partial view of the tray table of FIG. 2 showing the location of the wire routed through the body of the tray table.
Figure 4:
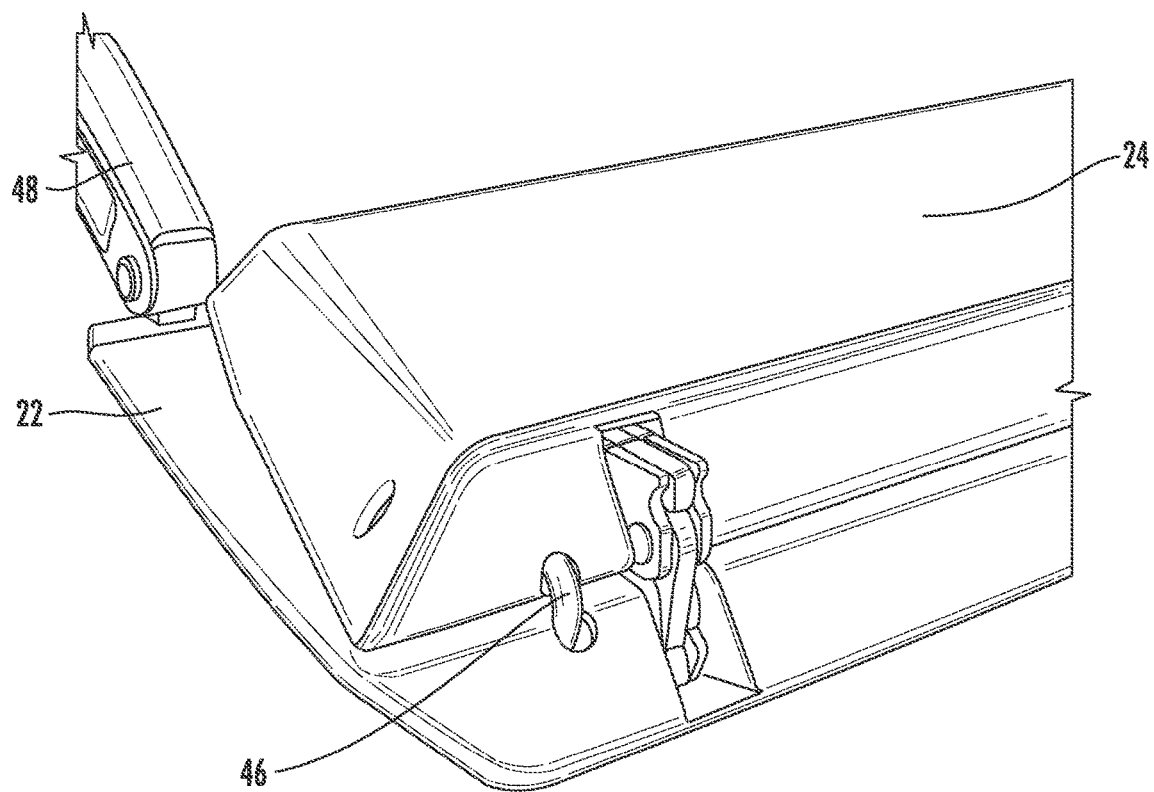
FIG. 4 is a partial view of the tray table of FIG. 2 with a portion of the tray table folded into a stowed position to better illustrate the location of the wire routed through the body of the tray table.
Figure 5:
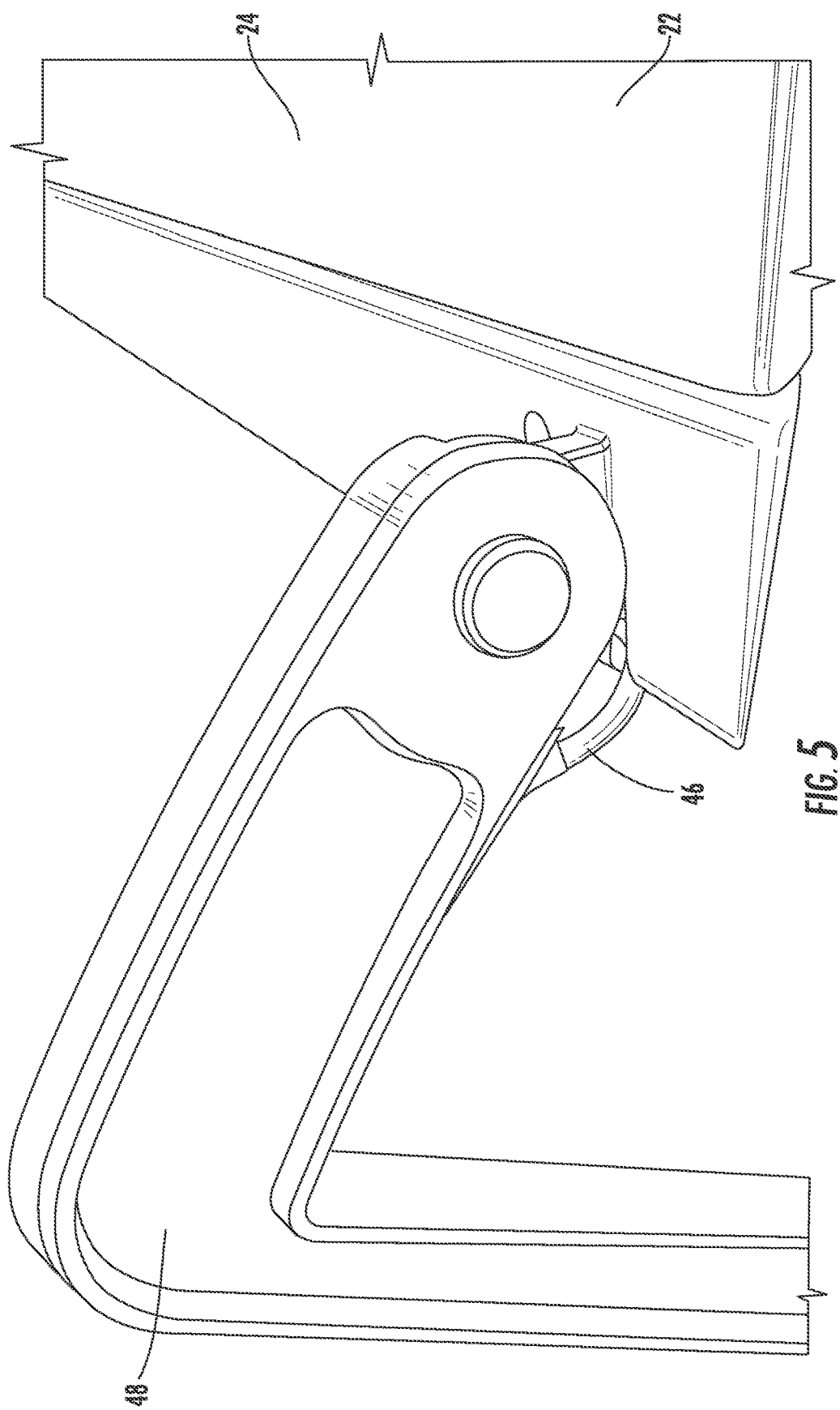
FIG. 5 is a partial view of the tray table of FIG. 2 showing a portion of the tray table arm and the location of the wire routed along an outer surface of the tray table arm.
Figure 6:
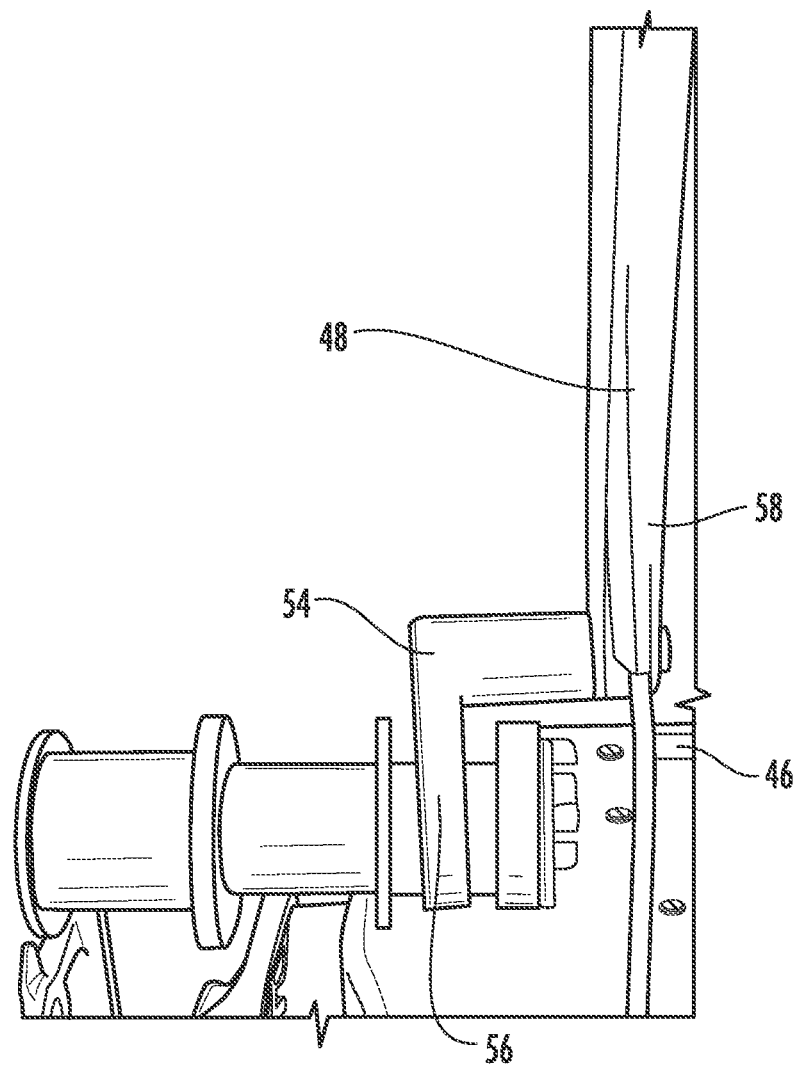
FIG. 6 is a partial view of the tray table arm of FIG. 5 and the location of the wire routed along the outer surface of the tray table arm and covered with a shroud until the wire reaches the passenger seat.

According to certain embodiments of the present invention, an aircraft passenger seat assembly 10 may comprise at least one IPT unit 12. The IPT unit 12 typically comprises a first metallic coil assembly 14 and a PCB 16. Electrical current is supplied to the coil assembly 14, often in a magnitude of less than 200 mA, which creates an alternating electromagnetic field. When a PED 18 containing a second metallic coil assembly 20 is positioned in close proximity to, and aligned with, the coil assembly 14 (as illustrated in FIG. 1), the coil assembly 20 responds to the alternating electromagnetic field by generating an electromotive force, EMF, which in turn generates electrical current to charge a battery within the PED 18. For devices that do not have IPT capable batteries, an attachment dongle may be used to provide the necessary IPT components to charge the device just as well as IPT capable devices. In certain embodiments, the IPT unit 12 may be used to power devices directly when those devices are placed within the appropriate proximity to the IPT unit 12.

When these components are assembled in a particular way and the PCB 16 is suitably programmed, the IPT unit 12 will have the capability to inductively charge devices through a variety of materials within a certain range, allow for charging up to a certain limit, and properly identify candidate charging systems.

In certain embodiments, as shown in FIGS. 1-6 and 9, the IPT unit 12 may be integrated between outer shrouds 22 of a tray table 24 (forward or aft), with the PCB 16 and the coil assembly 14 positioned inside the tray table 24. In other embodiments, the coil assembly 14 may be positioned inside the tray table 24, while the PCB 16 may be located outside of the tray table 24 and positioned within a seat back 34 or below the passenger seat 10 in an inconspicuous location. For example, the PCB 16 may be positioned near or within a power supply 28 or an in-flight entertainment ("IFE") box 30 located below the passenger seat 10, particularly since the IPT unit 12 is connected to one of these units 28, 30 to provide electrical current to the coil assembly 14.

In these embodiments, a portion 42 of one of the outer shrouds 22 of the tray table 24 may be marked with a power location 44. The power location 44 may be configured to indicate the location and direction for positioning the PED 18 on the power location 44 so that the coil assembly 20 within the PED 18 is properly aligned with respect to the coil assembly 14 inside the tray table 24 to ensure that power is transferred to the PED 18.

Because the distance between the IPT unit 12 and the PED 18 is also a critical factor that impacts the efficiency of charging (particularly at low power transmissions), the power location 44 may be configured so that the distance between the coil assembly 14 and the second coil assembly 20 is between 41 mm-60 mm, while also achieving a charging efficiency of at least 80%. In further embodiments, to further improve the charging efficiency above 80%, the power location 44 may be configured so that the distance between the coil assembly 14 and the second coil assembly 20 is between 35 mm-41 mm, and may be further configured so that the distance is between 9 mm-35 mm, and may be further configured so that the distance is 9 mm or less.

Furthermore, the power location 44 is formed of materials that do not impede or interfere with charging, which include but are not limited to non-metallic materials, including but not limited to lexan, polycarbonates, other suitable plastic and composite materials, woven and non-woven fabric materials, or other suitable materials. In certain embodiments, other portions of the outer shroud 22 (that do not cover the coil assembly 14) may have a thickness that exceeds the maximum thickness suitable to cover the power location 44 and/or may be reinforced with metal sheets or other materials that would impede or otherwise interfere with charging (if positioned over the coil assembly 14), but which may be needed to ensure that the tray table 24 is able withstand ordinary and repeated use by passengers.

In such cases, the power location 44 may be integrally formed with the shroud using a mold that decreases the thickness of the power location 44 and/or imparts the requisite markings into the power location 44 shape. The power location 44 may be reinforced using a thin layer of a material having greater strength properties between the power location 44 and the coil 14 to ensure that the power location 44 is not damaged due to repeated use and ordinary wear and tear by passengers.

Furthermore, in certain embodiments, the power location 44 may be a separately formed unit that is attached to a cutout location in one of the outer shrouds 22. By separately forming the power location 44, a stronger (and potentially more expensive) material may be used to form the power location 44, which ensures that the thinner material is able to withstand repeated use, while having the option of using standard (and potentially less expensive) materials to form the remainder of the shroud 22, thus avoiding any unnecessarily increasing the overall costs of the tray tables 24.

Wires 46 are required to provide electrical current to the IPT unit 12 and/or to connect the PCB 16 to the coil assembly 14. In the tray table 24, as illustrated in FIGS. 1-6, these wires 46 may be routed through the tray table 24 and then through or along the tray table arms 48 into the seat back 34 to reach the power supply 28 and/or the IFE box 30 (and the PCB 16 if it is separated from the coil assembly 14). In order to conceal the wires 46 while the tray table 24 is in use, one or both of the tray table arms 48 may comprise a hollow core to allow the wires 46 to be fed through them down to the seat back 34. In other embodiments, the wires 46 may be hidden via plastic shrouding 50 that covers one or both tray table arms 48 and the wires 46.

In other embodiments, as illustrated in FIGS. 8, 10-11, and 15-16, the IPT unit 12 may be integrated into the seat back 34. In these embodiments, the PCB 16 may be located anywhere along the length and width of the seat back 34 and/or below the passenger seat 10 positioned near or within the power supply 28 or the IFE box 30. One or more coil assemblies 14 may be located in any specific location in the seat back 34 where the PED 18 may be charged.

Figure 8:
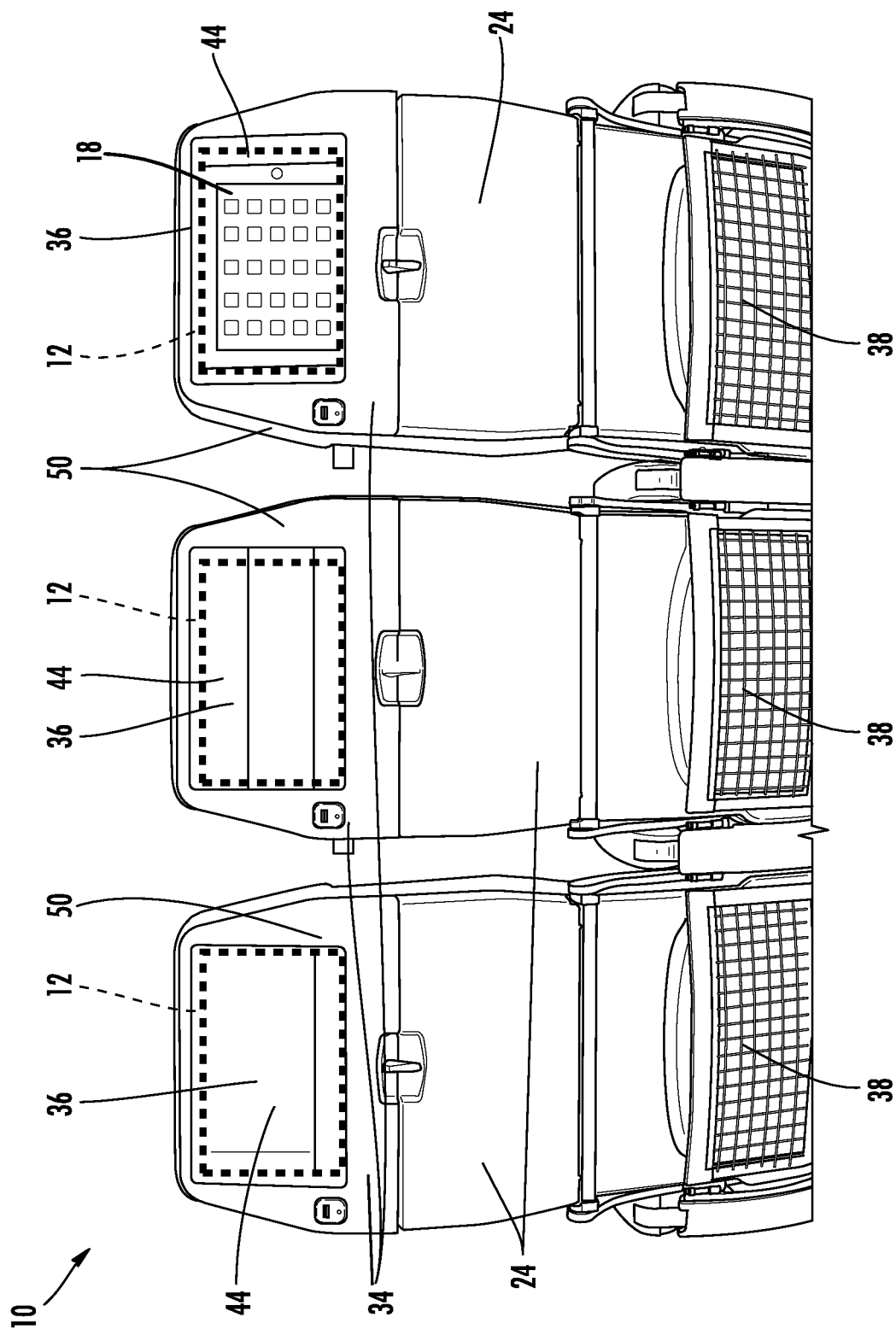
FIG. 8 is a rear view of a row of aircraft passenger seats indicating a location of the inductive wireless power unit within a seat back behind an upper literature pocket, according to certain embodiments of the present invention.
Figure 9:
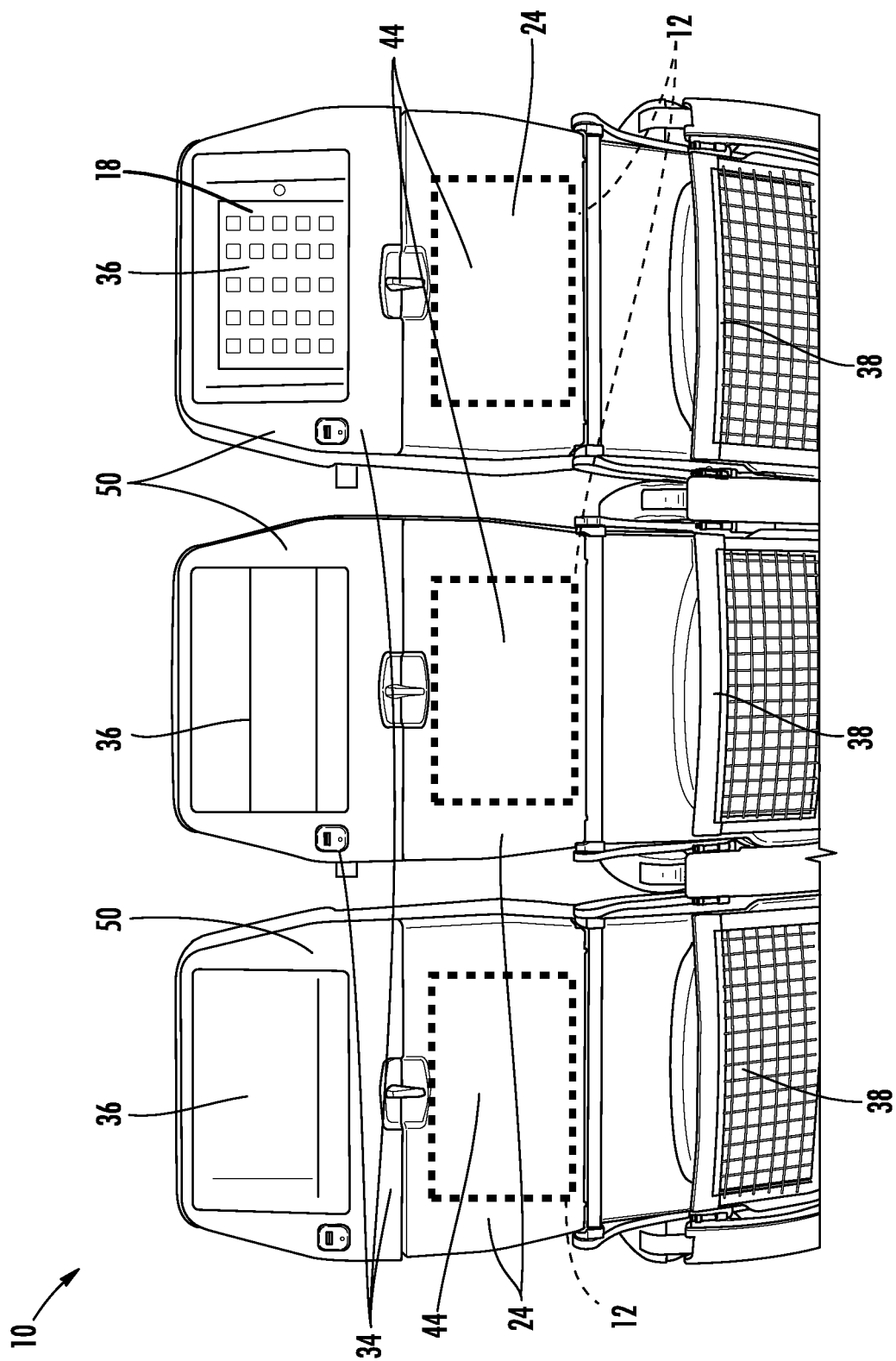
FIG. 9 is a rear view of a row of aircraft passenger seats indicating a location of the inductive wireless power unit within a seat back behind a tray table or within the tray table, according to certain embodiments of the present invention.
Figure 10:
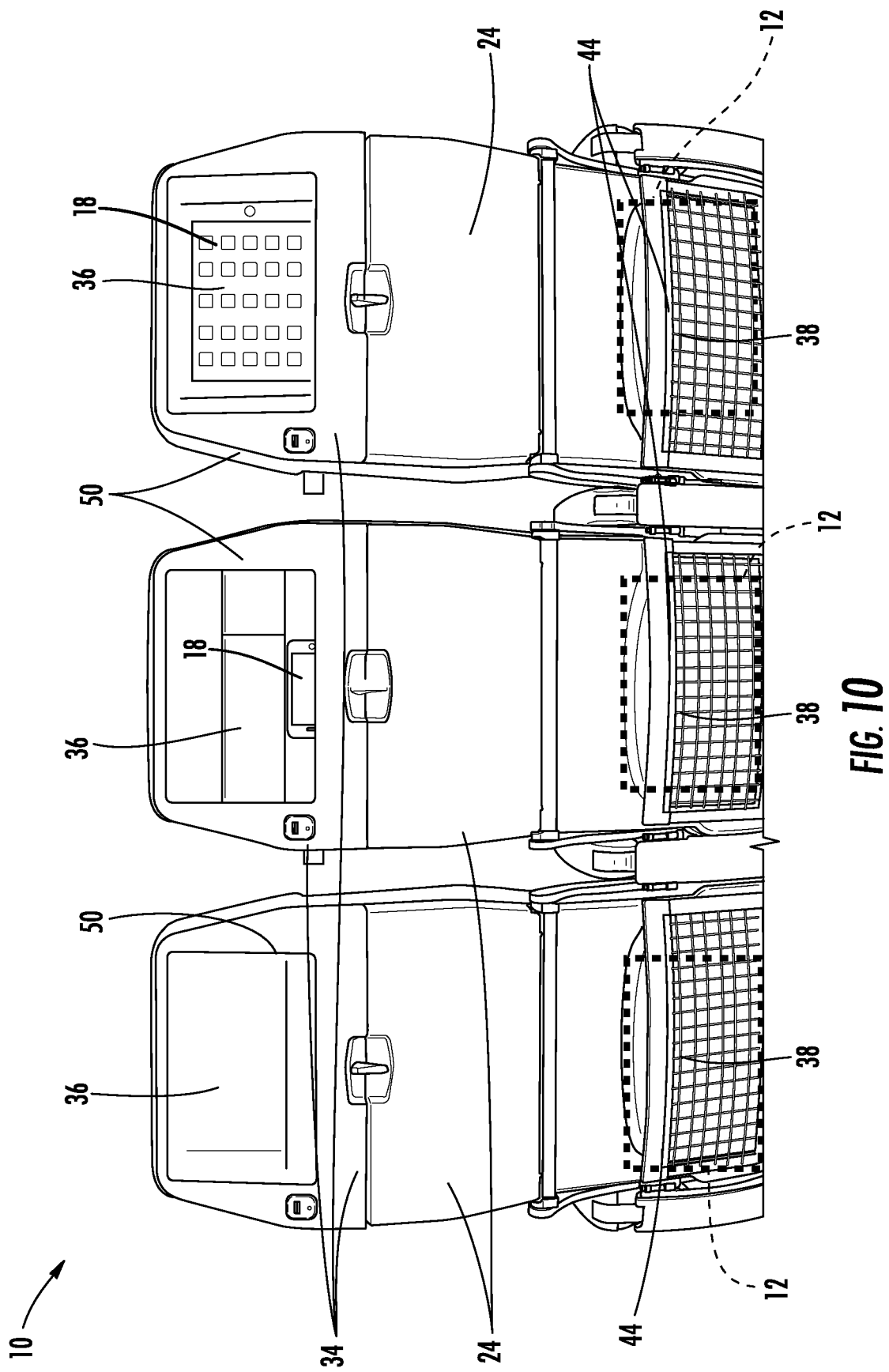
FIG. 10 is a rear view of a row of aircraft passenger seats indicating a location of the inductive wireless power unit within a seat back behind a lower literature pocket, according to certain embodiments of the present invention.
Figure 11:
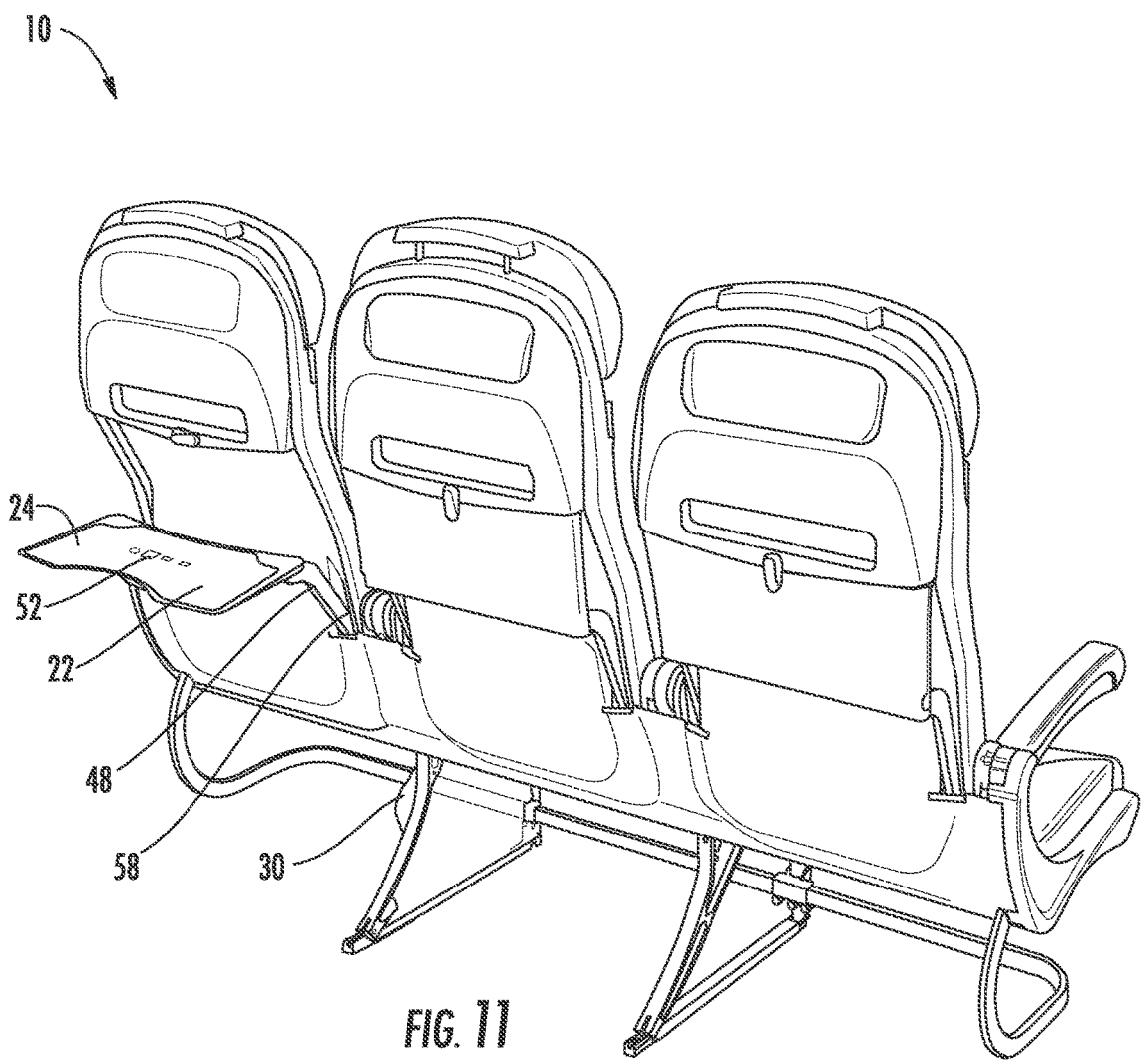
FIG. 11 is a rear view of a row of aircraft passenger seats indicating a location of an electronic reader within a tray table, according to certain embodiments of the present invention.

In these embodiments, an outer shroud 50 of the seat back 34 may be marked with the power location 44. As described above with respect to the tray table 24, the power location 44 may be configured to indicate the location and direction for positioning the PED 18 on the power location 44 so that the coil assembly 20 within the PED 18 is properly aligned with respect to the coil assembly 14 inside the tray table 24 to ensure that power is transferred to the PED 18. Since the power location 44 is substantially vertical in these embodiments, a mechanism to hold the PED 18 to the power location 44 may be required. For example, as illustrated in FIG. 8, the power location 44 may be positioned behind an upper literature pocket 36 so that the PED 18 may charge while in an acceptable viewing position. As illustrated in FIG. 10, the IPT unit 12 may also be positioned inside a lower literature pocket 38. In yet other embodiments, the power location 44 may be positioned in any other suitable location or niche within the seat back 34 and/or surrounding seat shell.

Because the distance between the IPT unit 12 and the PED 18 is also a critical factor that impacts the efficiency of charging (particularly at low power transmissions), the power location 44 may be configured so that the distance between the coil assembly 14 and the second coil assembly 20 is between 41 mm-60 mm, while also achieving a charging efficiency of at least 80%. In further embodiments, to further improve the charging efficiency above 80%, the power location 44 may be configured so that the distance between the coil assembly 14 and the second coil assembly 20 is between 35 mm-41 mm, and may be further configured so that the distance is between 9 mm-35 mm, and may be further configured so that the distance is 9 mm or less.

In certain embodiments, other portions of the outer shroud 50 (that do not cover the coil assembly 14) may have a thickness that exceeds the maximum thickness suitable to cover the power location 44 and/or may be reinforced with metal sheets or other materials that would impede or otherwise interfere with charging (if positioned over the coil assembly 14), but which may be needed to ensure that the seat back 34 is able withstand ordinary and repeated use by passengers.

In such cases, the power location 44 may be integrally formed with the outer shroud 50 using a mold that decreases the thickness of the power location 44 and/or imparts the requisite markings into the power location 44 shape. The power location 44 may be reinforced using a thin layer of a stronger material between the power location 44 and the coil 14 to ensure that the power location 44 is not damaged due to repeated use and ordinary wear and tear by passengers.

Furthermore, in certain embodiments, the power location 44 may be a separately formed unit that is attached to a cutout location in the outer shroud 50. By separately forming the power location 44, a stronger (and potentially more expensive) material may be used to form the power location 44, which ensures that the thinner material is able to withstand repeated use, while also being able to use standard (and potentially less expensive) materials to form the remainder of the outer shroud 50, thus avoiding any unnecessarily increasing the overall costs of the seat back 34.

Because the IPT unit 12 is positioned within the seat back 34, there is less concern about the need to hide the wires 46 that provide electrical current to the IPT unit 12 and/or to connect the PCB 16 to the coil assembly 14. Rather, the wires 46 are hidden from view by the seat back 34.

Figure 7:
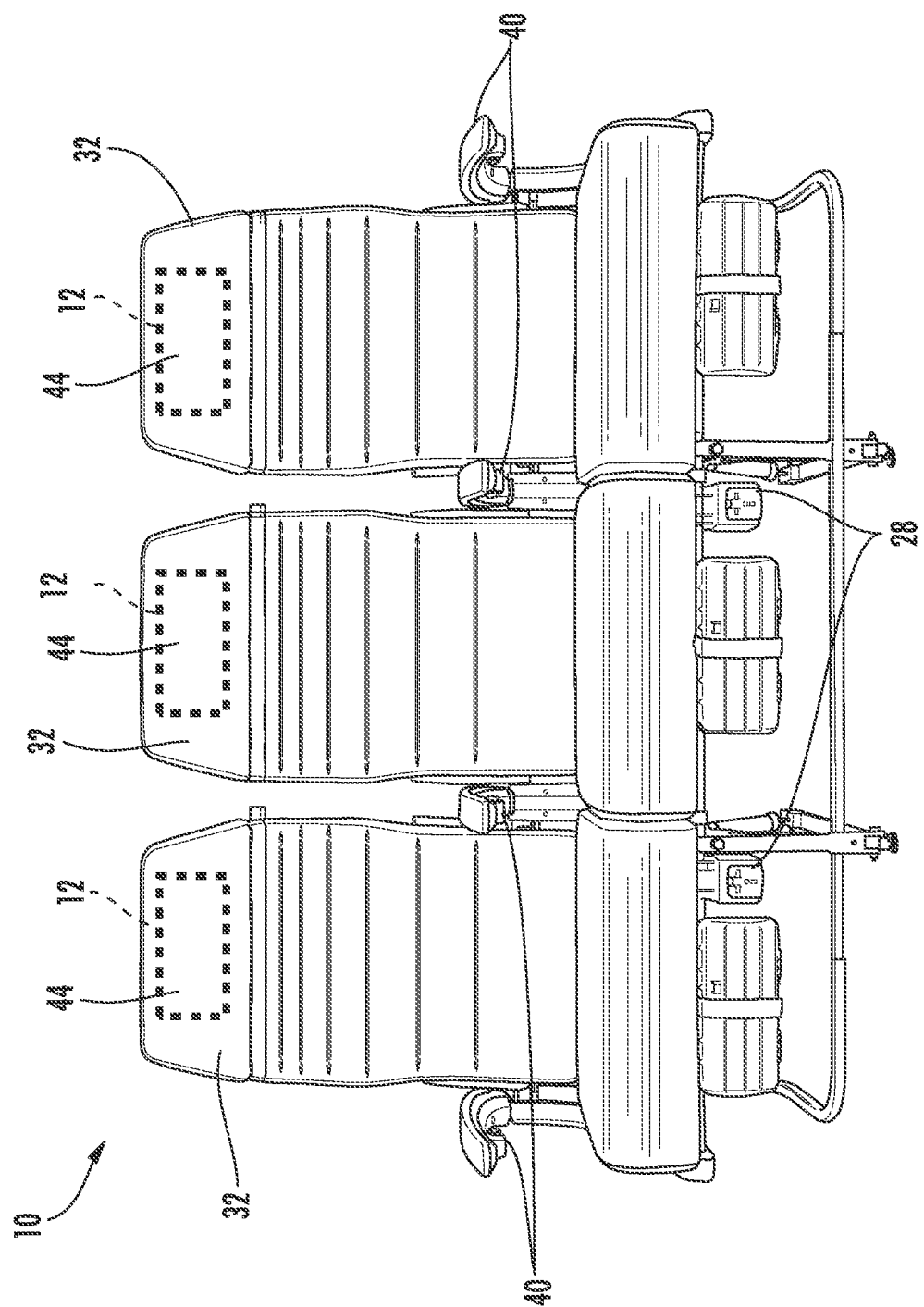
FIG. 7 is a front view of a row of aircraft passenger seats indicating a location of the inductive wireless power unit within a headrest, according to certain embodiments of the present invention.

As illustrated in FIG. 7, the IPT unit 12 may also be incorporated into other areas of economy class, first class, and/or business class passenger seats 10, such as a headrest 32 to charge new versions of IFE equipment and/or to charge wireless headphones while being worn by passengers seated in the passenger seat 10. Other suitable locations for the IPT unit 12 include a cocktail tray, center console, end bay, seat shell, or other niches formed in the passenger seat 10 or surrounding shells or monuments. The IPT unit 12 may also be reduced in size to accommodate smaller spaces within the passenger seat 10, such as an arm rest 40 or a cocktail tray or other smaller-sized console.

In each case, the entire IPT unit 12 may be located in the respective position or just the coil assembly 14 may be located in the respective position and connected to the PCB 16 that is located within the seat back 34 or below the passenger seat 10 within or near the power supply 28 or the IFE box 30.

Because the distance between the IPT unit 12 and the PED 18 is also a critical factor that impacts the efficiency of charging (particularly at low power transmissions), the power location 44 may be configured so that the distance between the coil assembly 14 and the second coil assembly 20 is between 41 mm-60 mm, while also achieving a charging efficiency of at least 80%. In further embodiments, to further improve the charging efficiency above 80%, the power location 44 may be configured so that the distance between the coil assembly 14 and the second coil assembly 20 is between 35 mm-41 mm, and may be further configured so that the distance is between 9 mm-35 mm, and may be further configured so that the distance is 9 mm or less.

Likewise, the material positioned between the coil assembly 14 and the PED 18 in each of these power locations 44 may be formed of materials that do not impede or interfere with charging, as described above. These power locations 44 may be integrally formed with the surrounding outer layers (at the requisite thickness and/or reinforced with a suitably strong material) or may be a separately formed unit that is attached to a cutout location in the outer layer. For example, with respect to the head rest location, the material positioned over the coil assembly 14 may comprise the head rest fabric and/or may comprise additional cushioning that protects the coil assembly 14 and/or cushions the passenger's head from the coil assembly 14.

Figure 15:
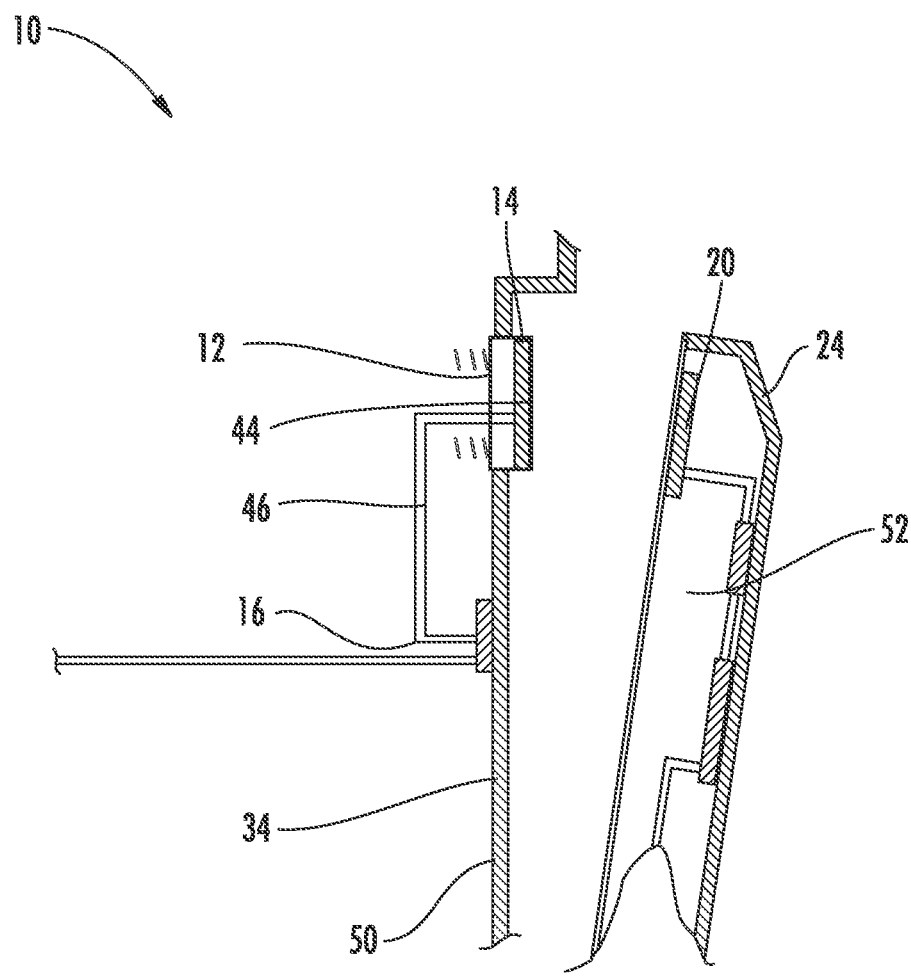
FIG. 15 is a side view of an inductive wireless power unit positioned within a passenger seat back, and an electronic reader and coil assembly positioned within a tray table, wherein the tray table is in a partially deployed position, according to certain embodiments of the present invention.
Figure 16:
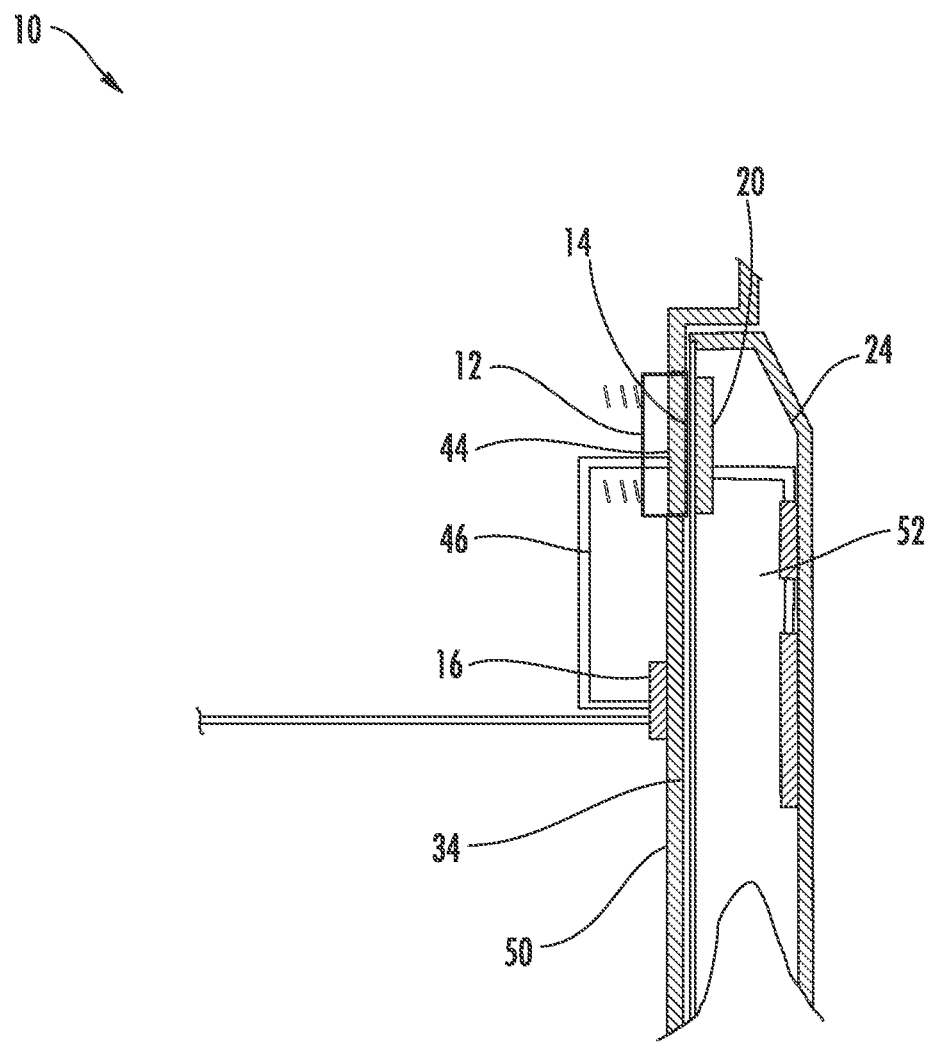
FIG. 16 is a side view of the inductive wireless power unit and electronic reader and coil assembly of FIG. 15, wherein the tray table is in a stowed position.

In certain embodiments, as illustrated in FIGS. 15-16, the IPT unit 12 may be positioned within the seat back 34 and used to charge an electronic reader 52 positioned within the tray table 24. In these embodiments, the electronic reader 52 includes a coil assembly 20 positioned below a suitably thin portion of the shroud 22, and the coil assembly 14 is positioned within a cutout location in the outer shroud 50 so that the coil assembly 14 is positioned as closely as possible to the coil assembly 20 when the tray table 24 is in the stowed position to effectively charge the electronic reader 52. The PCB 16 recognizes when the coil assembly 20 is in close proximity to the coil assembly 14 and switches on the charging, as shown in FIG. 16. The PCB 16 also recognizes when the battery of the electronic reader 52 is 98% charged and/or exceeds 60° C., and switches off the charging when either condition is present. The PCB 16 also switches off the charging when it senses that the coil assembly 20 is not in close proximity to the coil assembly 14, as shown in FIG. 15.

Figure 12:
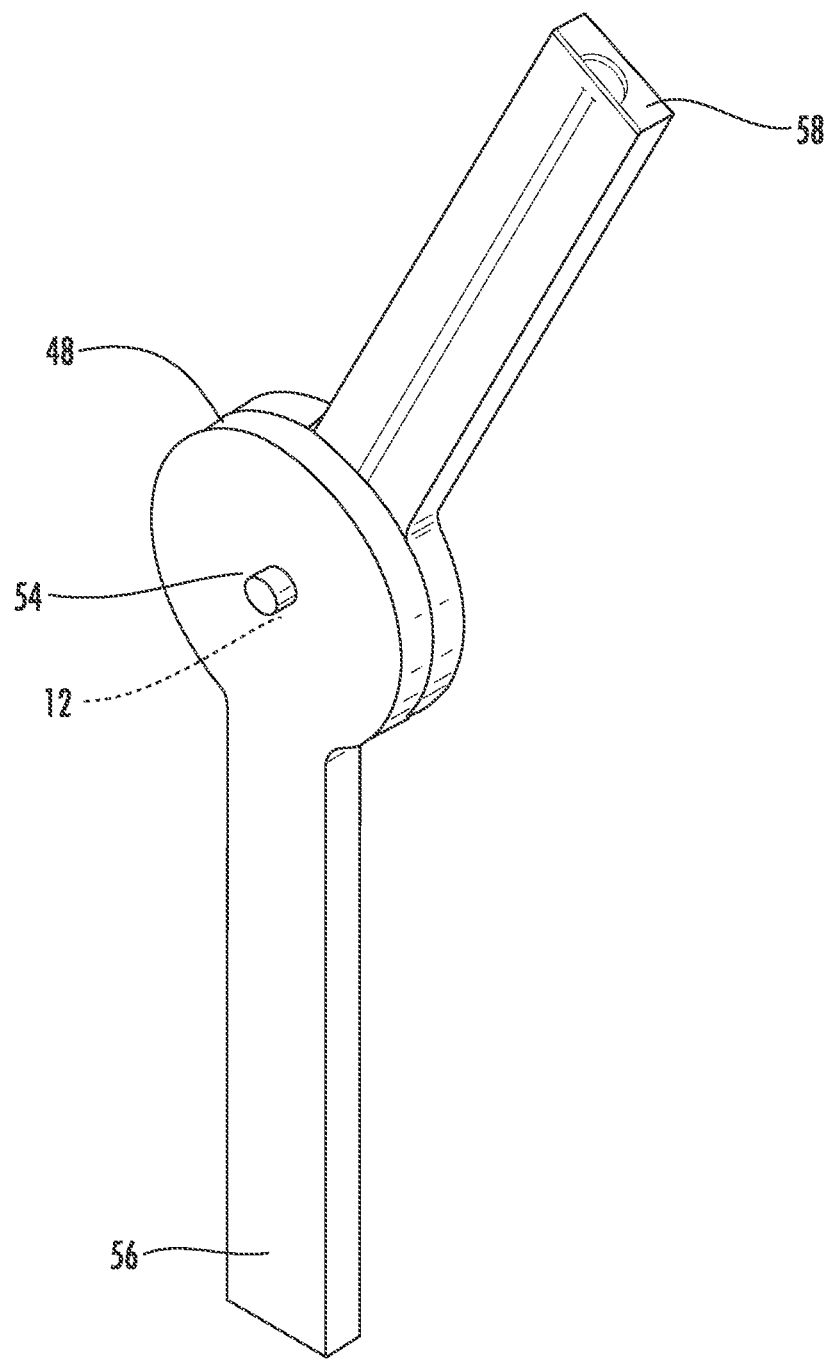
FIG. 12 is a perspective view of a tray table arm having an inductive wireless power unit positioned within a pivot location of the tray table arm, according to certain embodiments of the present invention.
Figure 13:
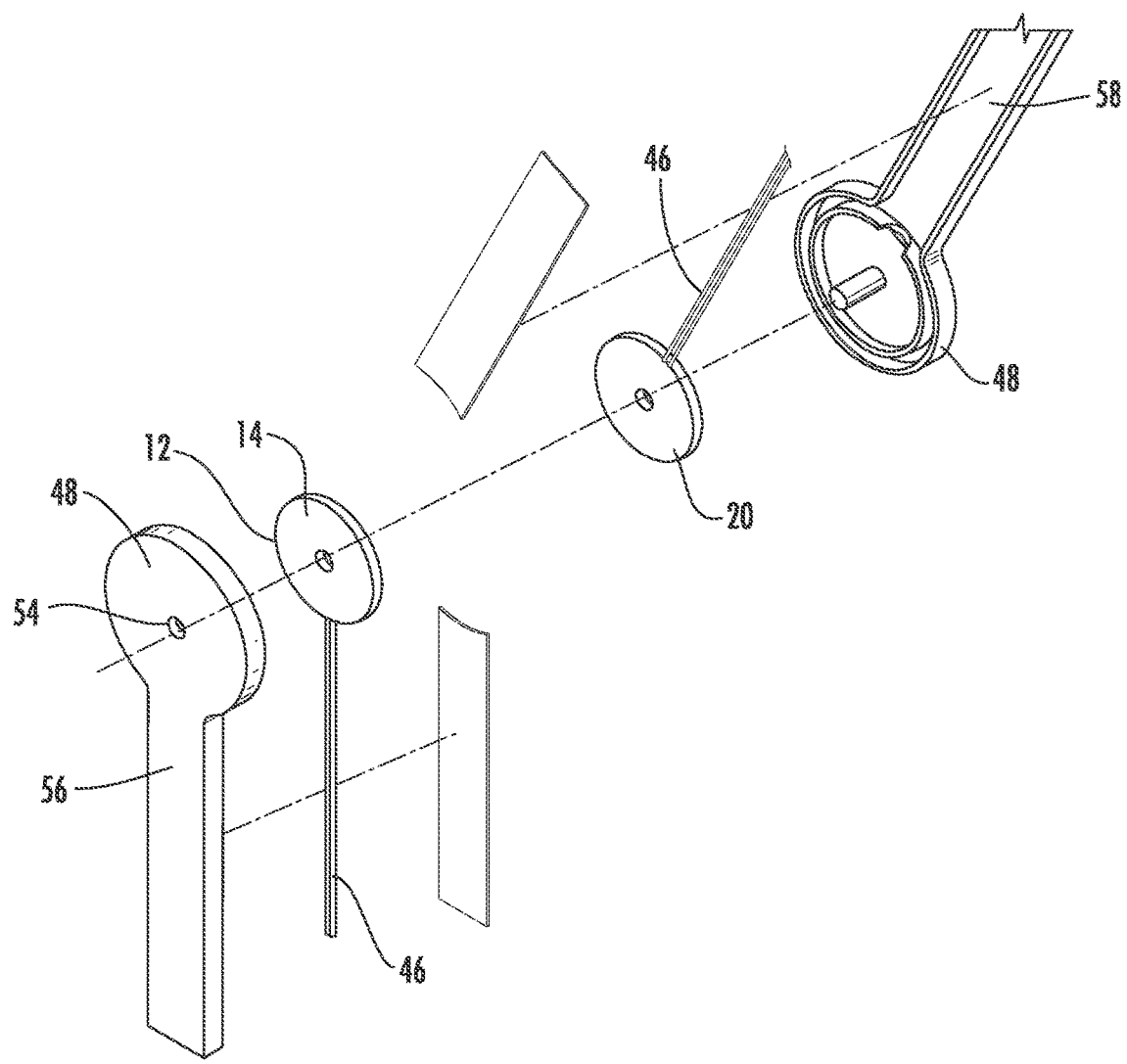
FIG. 13 is an exploded view of the tray table arm of FIG. 12.
Figure 14:
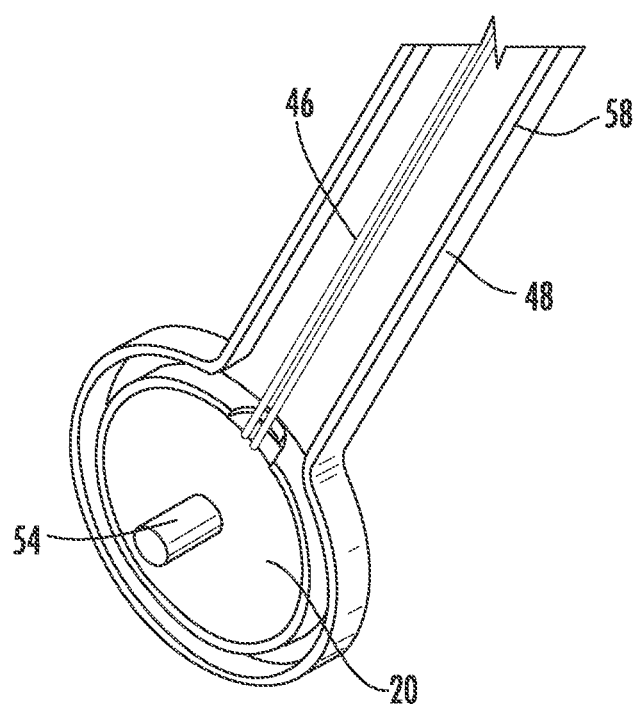
FIG. 14 is a partially assembled view of the tray table arm of FIG. 12.

In other embodiments, of the electronic reader 52, the IPT unit 12 may be located in a pivot location 54 of the tray table arms 48, as illustrated in FIGS. 12-14. In these embodiments, wires 46 may be positioned within a lower portion 56 of the tray table arm 48 and connected to a coil assembly 14 positioned at the pivot location 54. The coil assembly 20 is positioned in close proximity to the coil assembly 14 at the pivot location 54 and attached to an upper portion 58 of the tray table arm 48. Additional wires 46 connect the coil assembly 20 to the electronic reader 52 in the tray table 24. In these embodiments, the coil assemblies 14, 20 remain in close proximity to one another when the tray table 24 is deployed and stowed, thus providing a continuous charge and/or continuous power to the electronic reader 52 without the concern over routing wires 46 through the articulating pivot location 54.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. An aircraft passenger seat assembly comprising:
a passenger seat comprising a cutout;
a component comprising an outer surface positioned proximate to the passenger seat such that the component is positioned within the cutout; and
an inductive wireless power unit comprising a coil assembly, wherein the coil assembly is positioned within the component, wherein:
the coil assembly is configured to charge a personal electronic device when the personal electronic device is positioned adjacent to the component;
a portion of the outer surface of the component covers the coil assembly; and
wires connecting the coil assembly to a power supply are hidden from view within the aircraft passenger seat assembly.

2. The aircraft passenger seat assembly of claim 1, wherein the component is at least one of (i) a portion of a shell surrounding the passenger seat, (ii) a portion of a headrest, (iii) a portion of the passenger seat adjacent to an upper literature pocket, (iv) a portion of the passenger seat adjacent to a lower literature pocket, (v) a portion of a tray table, (vi) a portion of an arm rest, and (vii) a portion of a cocktail tray.

3. The aircraft passenger seat assembly of claim 1, wherein the inductive wireless power unit further comprises a printed circuit board positioned within the passenger seat.

4. The aircraft passenger seat assembly of claim 1, wherein the portion of the outer surface covering the coil assembly is formed of non-metallic materials.

5. The aircraft passenger seat assembly of claim 1, wherein the portion of the outer surface covering the coil assembly is integrally formed with a remainder of the outer surface.

6. The aircraft passenger seat assembly of claim 1, wherein the portion of the outer surface covering the coil assembly is coupled to a remainder of the outer surface.

7. The aircraft passenger seat assembly of claim 1, wherein the personal electronic device comprises a second coil assembly positioned at a distance of 9 mm-35 mm from the coil assembly during charging.

8. The aircraft passenger seat assembly of claim 1, wherein the component comprises a portion of the passenger seat such that the coil assembly is positioned behind a stowage location for a tray table.

9. The aircraft passenger seat assembly of claim 8, wherein a second coil assembly is positioned within the tray table in a location that is within close proximity of the coil assembly when the tray table is in a stowed position.

10. The aircraft passenger seat assembly of claim 9, wherein the tray table comprises an electronic reader.

11. The aircraft passenger seat assembly of claim 1, wherein the coil assembly is positioned such that the personal electronic device charges while in an acceptable viewing position.

12. An aircraft passenger seat assembly comprising:
a passenger seat back comprising an outer shroud; and
an inductive wireless power unit comprising a coil assembly, wherein the coil assembly is positioned within the passenger seat back to charge a personal electronic device, wherein:
the coil assembly is positioned such that the personal electronic device charges while in an acceptable viewing position;
a portion of the outer shroud covers the coil assembly; and
wires connecting the coil assembly to a power supply are hidden from view within the passenger seat back.

13. The aircraft passenger seat assembly of claim 12, wherein the inductive wireless power unit further comprises a printed circuit board positioned within the passenger seat back.

14. The aircraft passenger seat assembly of claim 12, wherein the portion of the outer shroud covering the coil assembly is formed of non-metallic materials.

15. The aircraft passenger seat assembly of claim 12, wherein the portion of the outer shroud covering the coil assembly is integrally formed with a remainder of the outer shroud.

16. The aircraft passenger seat assembly of claim 12, wherein the portion of the outer shroud covering the coil assembly is coupled to a remainder of the outer shroud.

17. The aircraft passenger seat assembly of claim 12, wherein the coil assembly is positioned within the passenger seat back adjacent to an upper literature pocket such that the personal electronic device charges when positioned in the upper literature pocket.

18. The aircraft passenger seat assembly of claim 12, wherein the coil assembly is positioned within the passenger seat back adjacent to a lower literature pocket such that the personal electronic device charges when positioned in the lower literature pocket.

19. An aircraft passenger seat assembly comprising:
a tray table comprising a cutout, an outer shroud, and tray table arms pivotally coupled to the aircraft passenger seat assembly; and
an inductive wireless power unit comprising a coil assembly, wherein the coil assembly is positioned within the cutout of the tray table;
wherein a portion of the outer shroud covers the coil assembly; and
wherein wires connecting the coil assembly to a power supply are hidden from view along at least one of the tray table arms.

20. The aircraft passenger seat assembly of claim 19, wherein the coil assembly is positioned such that a personal electronic device charges while in an acceptable viewing position.

21. The aircraft passenger seat assembly of claim 19, wherein the portion of the outer shroud covering the coil assembly is integrally formed with a remainder of the outer shroud.

22. The aircraft passenger seat assembly of claim 19, wherein the portion of the outer shroud covering the coil assembly is coupled to a remainder of the outer shroud.

23. The aircraft passenger seat assembly of claim 19, wherein the wires are routed through a hollow core located within one of the tray table arms.

24. The aircraft passenger seat assembly of claim 19, wherein the wires are routed along an outer surface of one of the tray table arms.

25. An aircraft passenger seat assembly comprising:
a passenger seat comprising a cutout;
an inductive wireless power unit comprising a coil assembly, wherein the coil assembly is positioned within the cutout;
wherein the passenger seat is configured to receive and hold a personal electronic device adjacent to the cutout at an acceptable viewing position for a person seated behind the passenger seat; and
wherein the cutout is configured to position the coil assembly in close proximity to a coil assembly of the personal electronic device such that the personal electronic device charges while in the acceptable viewing position.

26. An aircraft passenger seat assembly comprising:
a tray table comprising a pivot location;
an inductive wireless power unit comprising a coil assembly, wherein the coil assembly is located within the pivot location of the tray table;
wherein the coil assembly is configured to be positioned in close proximity to a coil assembly of a personal electronic device to charge the personal electronic device.

* * * * *